(12) United States Patent
Goulanian et al.

(10) Patent No.: US 7,321,540 B2
(45) Date of Patent: Jan. 22, 2008

(54) WAVEGUIDE MULTILAYER HOLOGRAPHIC DATA STORAGE

(75) Inventors: Emine Goulanian, Richmond (CA); Nariman Ashurbekov, Richmond (CA); Faouzi Zerrouk, Vancouver (CA)

(73) Assignee: Southbourne Investments Limited, Jersey (GB)

( * ) Notice: Subject to any disclaimer, the term of this patent is extended or adjusted under 35 U.S.C. 154(b) by 132 days.

(21) Appl. No.: 10/495,578

(22) PCT Filed: Nov. 18, 2002
(Under 37 CFR 1.47)

(86) PCT No.: PCT/CA02/01849

§ 371 (c)(1),
(2), (4) Date: Feb. 25, 2005

(87) PCT Pub. No.: WO03/044574

PCT Pub. Date: May 30, 2003

(65) Prior Publication Data

US 2005/0201247 A1 Sep. 15, 2005

(30) Foreign Application Priority Data

Nov. 16, 2001 (CA) .................................. 2363279

(51) Int. Cl.
*G11B 7/00* (2006.01)

(52) U.S. Cl. .................................. 369/103

(58) Field of Classification Search ..................... None
See application file for complete search history.

(56) References Cited

U.S. PATENT DOCUMENTS

| 4,400,616 A | 8/1983 | Chevillat et al. |
| 5,465,311 A | 11/1995 | Caulfield et al. |
| 5,940,514 A | 8/1999 | Heanue et al. |
| 2002/0163873 A1* | 11/2002 | Kawano et al. ............. 369/103 |

FOREIGN PATENT DOCUMENTS

| JP | 62103681 | 5/1987 |
| JP | 2001-210088 | 8/2001 |
| WO | WO 01/57602 A1 | 8/2001 |

OTHER PUBLICATIONS

Shogo, Yagi, et al. "Multilayered Waveguide Holographic Memory Card" NTT Photonics Laboratories, NTT, Tokai, Ibaraki, 319-1193, Japan.
Shogo, Yagi, et al. "Reduction of Stripe Noise in MWH-ROM by Random Phase Modulation" NTT Photonic Laboratories, Tokai, Ibaraki, 319-1193, Japan pp. 162-163.

* cited by examiner

*Primary Examiner*—Wayne Young
*Assistant Examiner*—Parul Gupta
(74) *Attorney, Agent, or Firm*—Vermette & Co.

(57) ABSTRACT

The invention provides a method and apparatus for providing a high information capacity, high data rate and short access time simultaneously. The method and apparatus include a multilayer waveguide holographic carrier, a multilayer waveguide holographic data storage system, a multilayer waveguide hologram reading method with random data access, and a process and apparatus for recording matrix waveguide hologram layers and assembling a multilayer carrier.

16 Claims, 16 Drawing Sheets

WAVEGUIDE MULTILAYER HOLOGRAPHIC DATA STORAGE

FIELD OF THE INVENTION

The present invention relates to volume holographic data storage and more particularly, to waveguide multilayer holographic data storage systems for providing a high throughput of data storage.

BACKGROUND

The logic of evolution of modern information technologies dictates a necessity to create data storage systems with a high information capacity, a high data rate and small access time, i.e. a high throughput system. Many researchers use the CRP (capacity-rate product) factor for the throughput estimation where CRP=Capacity[GB]×Data Rate[Mbps] (High Throughput Optical Data Storage Systems *An OIDA Preliminary Workshop Report* April 1999. Prepared for Optoelectronic Industry Development Association by Tom D. Milster).

A more objective factor, being proposed for use in this invention, is CARP (capacity-access-rate product), which is the capacity in GB, divided by access time in ms and multiplied by the data rate in Mbps. We have CARP={C [GB]/A[ms]}×Data Rate[Mbps]. A comparison of CARP factors gives the possibility to estimate objectively the advantages of any data storage system in terms of throughput.

It is clear that a need exists for systems in future applications where CRP>$10^5$ and CARP>$10^6$. That is, for example, a memory system with >1 GB information capacity, >100 Mbps data rate and <1 ms access time. At the same time, it is clear that it is necessary to ensure a minimum quality of recorded and readout signals, that is to provide a desired value of the signal/noise ratio and thereby to maintain a desired value of the error probability.

Holographic methods are considered the most prospective for high throughput data storage. More specifically, the data page oriented random access holographic memory is in the first place as a high throughput system. However, there have been difficulties and problems in the development of the high throughput system up to the present day. The high data rate for optical data storage systems depends on the light source power, sensitivity of photodetector, the number of information parallel input-output channels, and also on the conveying speed of the carrier or optical reading head, when using a design with moving mechanical parts.

For holographic storage a large number of parallel data channels is provided due to data presentation as two-dimensional pages of digital binary or amplitude data. Moreover, the highest data rate is provided when there are no moving mechanical parts, such as a rotating disk carrier.

Short random access time of a memory system is a result of applying a high-speed addressing system such as electro- or acousto-optical deflectors and using a recording-reading schema, which provides for transferring read images from different microholograms to a photodetector without any mechanical movement.

Use of a volume information carrier in optical (including holographic) data storage for providing a high information capacity and high information density is well known, as in U.S. Pat. No. 6,181,665 issued Jan. 30, 2001 to Roh. But existing methods of optical (holographic) data storage based on a volume carrier do not obtain high capacity and short random access time simultaneously in accordance with the circumstances indicated below.

There are several methods of volumetric holographic carrier applications. The first is using angle multiplexed volume holograms, which provide for the superimposing of data pages of Fourier or Fresnel holograms in the volume photorecording medium. Each of the holograms is recorded with a separate angle of the reference beam. The same angle of the readout beam is required for data page reading. Examples include Roh, U.S. Pat. No. 6,072,608 issued Jun. 6, 2000 to Psaltis et al., U.S. Pat. No. 5,896,359 issued Apr. 20, 1999 to Stoll, and U.S. Pat. No. 5,696,613 issued Dec. 9, 1997 to Redfield et al.

A second method is using encrypted holograms for holographic data storage as in U.S. Pat. No. 5,940,514 issued Aug. 17, 1999 to Heanue et al. In the Heanue system orthogonal phase-code multiplexing is used in the volume medium and the data is encrypted by modulating the reference beam.

This method has a number of limitations. The main problem is a deficiency of the volumetric medium in meeting the necessary requirements. For example, ferroelectric crystals do not exhibit sufficiently great stability, and photopolymers have too large a shrinkage factor.

A third method is using holograms recorded in a multi-layer medium as described by "Holographic multiplexing in a multilayer recording medium", Arkady S. Bablumian, Thomas F. Krile, David J. Mehrl, and John F. Walkup, *Proc. SPIE*, Vol. 3468, pp. 215-224 (1998) and by Milster. One or more holograms (a hologram matrix) are recorded in each layer of the volume carrier. A readout of each hologram is made by a separate reading beam. A limitation of this method is a low layer count, the number of layers being limited by the noise from neighboring holograms located on other layers.

The last method is using waveguide multilayer holograms. See "Medium, method, and device for hologram recording, and hologram recording and reproducing device", Mizuno Shinichi (Sony Corp.) JP09101735A2, Publication date: Apr. 15, 1997. Waveguide holograms are recorded in thin films of a multilayer carrier. Known methods of multilayered waveguide hologram recording and reading do not provide a high data density and small access time simultaneously.

International Publication No. WO 01/57602 discloses the recording of holograms in a wave guide layer formed in a structure containing multiple wave guide layers. An optical system allows the writing of holograms in the wave guide layer and subsequent reading of the written holograms. However, the memory system does not provide a combination of very low access time and high data density simultaneously because the data carrier tape or data storage card moves during readout. Any mechanical movement in a data storage system results in a relatively long data access time.

The analysis of known methods and apparatus in the field of holographic data storage permit to draw a conclusion: at the present time there is no high throughput holographic data storage system approach providing a high value of the CARP factor.

It is an objective of this invention to provide a holographic storage system with a high CARP factor.

SUMMARY

The present method offers an integrated approach to solving a problem of providing a high information capacity, high data rate and short access time simultaneously. The required characteristics of a system are provided by a tightly bounded information carrier construction technique and new methods of data accessing, reading and recording.

The present invention includes a multilayer waveguide holographic carrier, a multilayer waveguide holographic data storage system, a multilayer waveguide hologram reading method with random data access, and a process and apparatus for recording matrix waveguide hologram layers and assembling a multilayer carrier. The multilayer wave guide hologram reading method incorporates an electronic moving window provided by a spatial light modulator (SLM) or charge coupled device (CCD) on the surface of the multilayer wave guide. The hologram pitch is related to the SLM or CCD element size.

BRIEF DESCRIPTION OF THE DRAWINGS

The invention itself both as to organization and method of operation, as well as objects and advantages thereof, will become readily apparent from the following detailed description when read in connection with the accompanying drawings.

DETAILED DESCRIPTION

Multilayer Holographic Data Storage Carrier

Figure 1A:
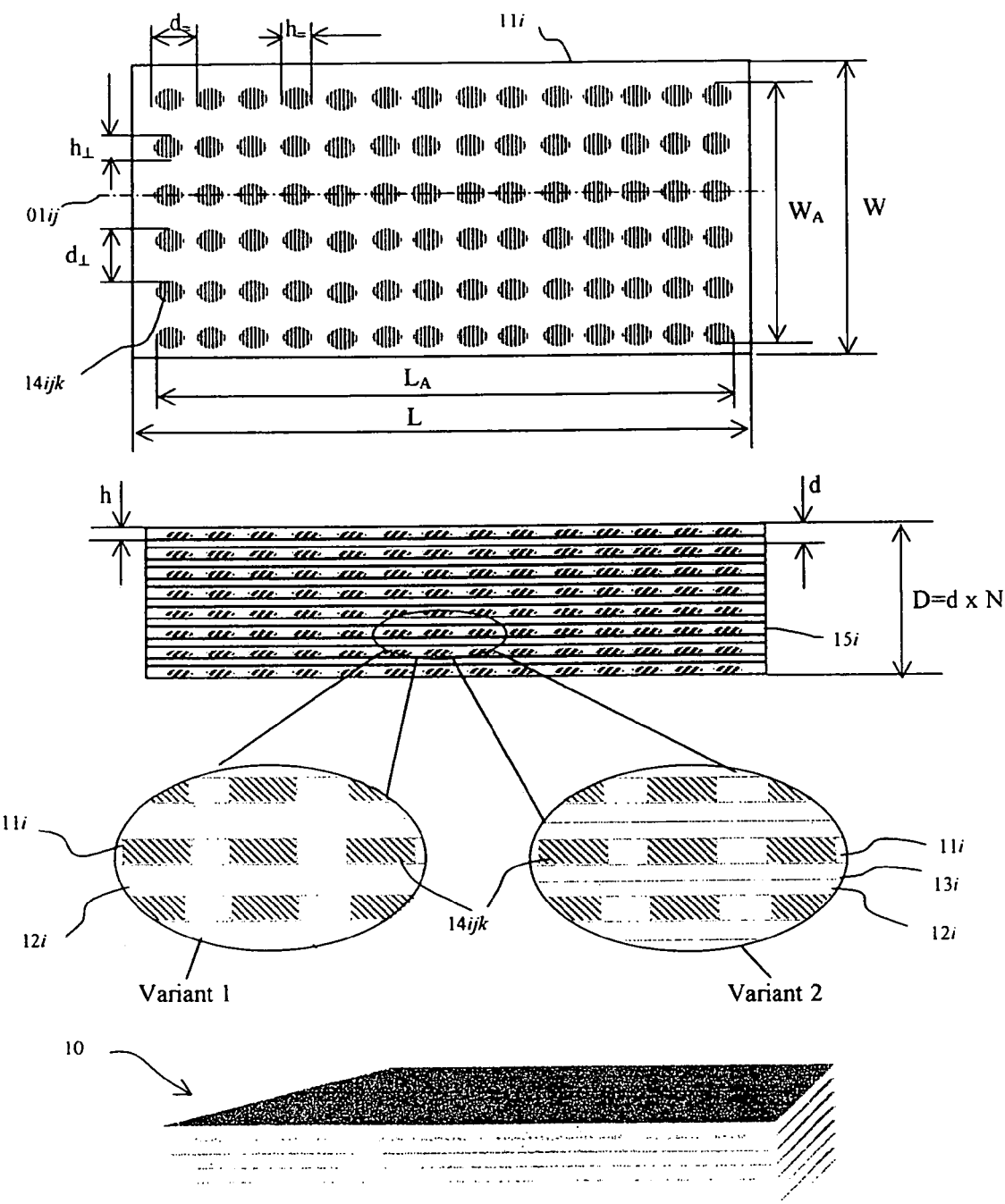
FIG. 1a shows a multilayer waveguide holographic carrier with end surface couplers for a reference beam.
Figure 1B:
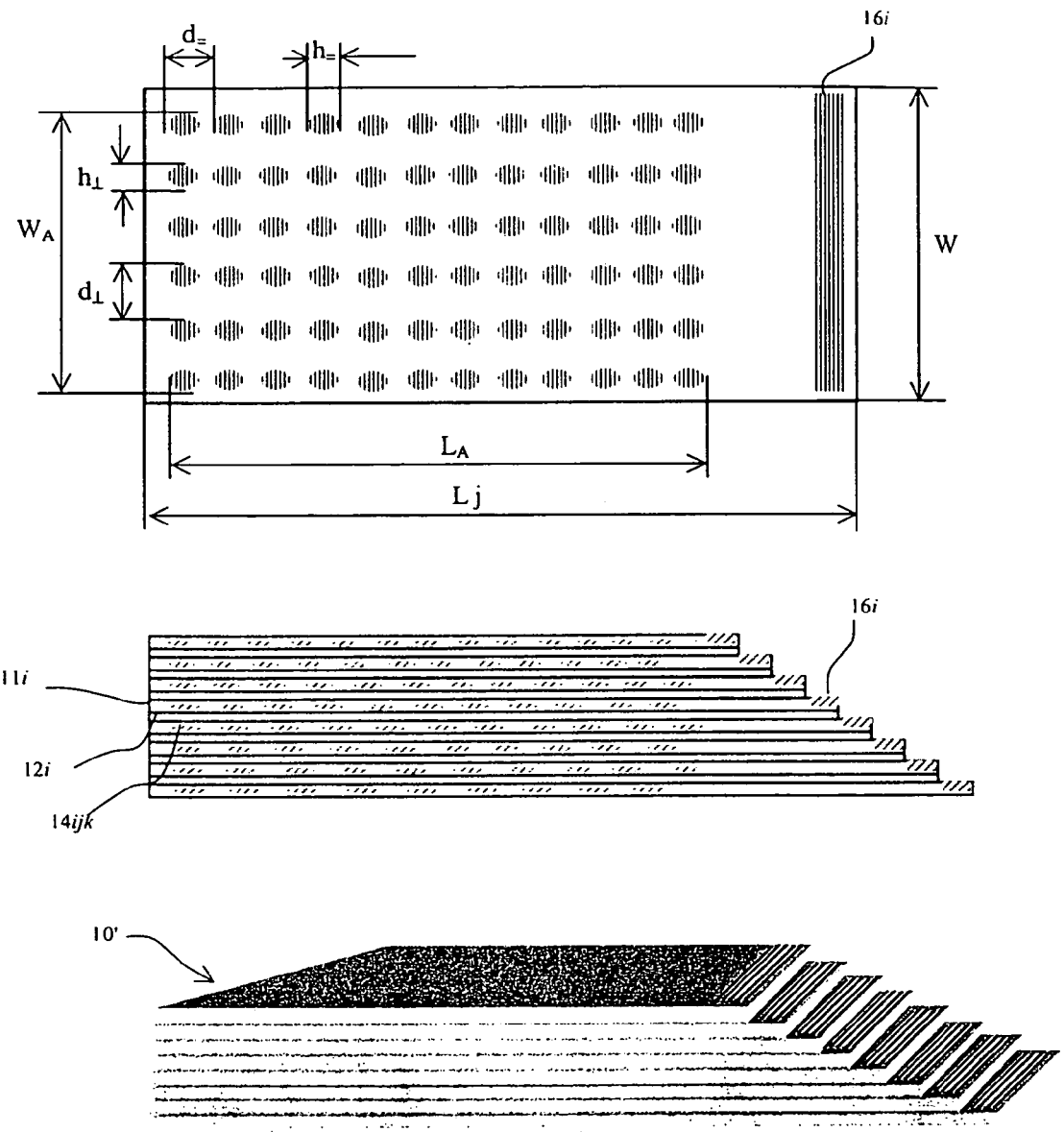
FIG. 1b shows a multilayer waveguide holographic carrier with diffraction grating couplers for a reference beam.

FIGS. 1a and 1b show a multilayer holographic waveguide data storage carrier 10. It comprises layer groups each containing a hologram layer 11i where i is the current layer index and cladding layer 12i. Holograms 14i,k are located along row axis 01ij where j is the current row index and k is the current hologram index. Holograms are non-overlapping in each of the rows.

In the first variant shown in FIG. 1a, hologram layer 11i in each group is at the same time a waveguide layer having end surface coupler 15i. In the second variant shown in FIG. 1a, the hologram layer 11i and waveguide layer 13i with a diffraction grating coupler 16i (seen in FIG. 1b) in each of the groups are made separately and attached to each other with an optical contact therebetween to provide transmission of the guided wave into the hologram layer. In both variants there is a cladding layer on the outer surface of the waveguide layer, with a similar function to prior art cladding layers.

In FIGS. 1a and 1b $h_=$ is the size of a hologram in the row direction and $d_=$ is the pitch of a hologram in the row direction. $h_\perp$ and $d_\perp$ are the size and pitch of the holograms respectively in the transverse direction. h is the thickness of a hologram layer and d is the pitch of the layers.

Figure 2A:
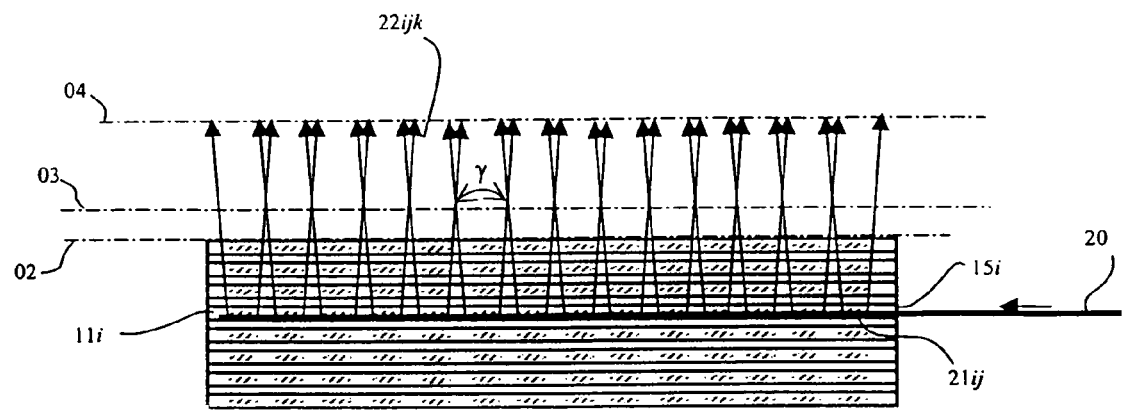
FIG. 2a illustrates a method of putting a reference beam into a waveguide layer of a data storage carrier through an end surface coupler and radiation from reconstructed holograms.
Figure 2B:
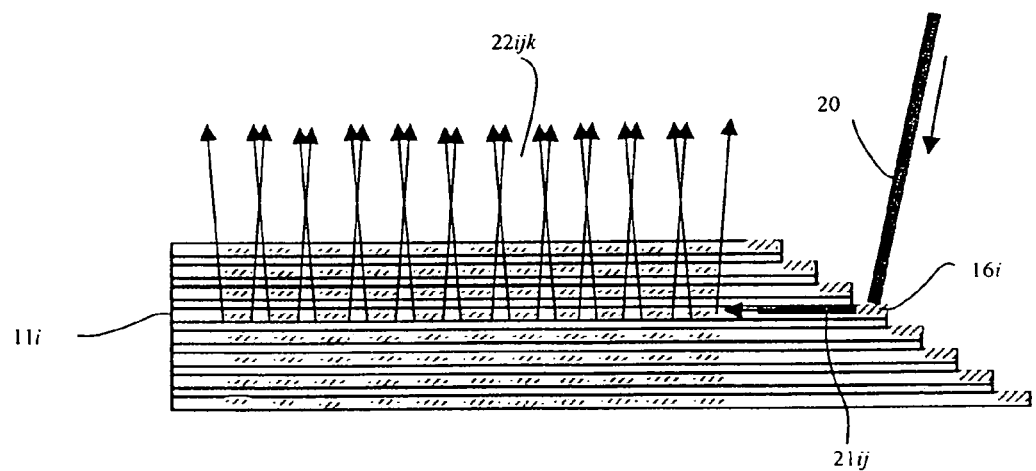
FIG. 2b illustrates a method of putting a reference beam into a waveguide layer of data storage carrier through a diffraction grating coupler and radiation from reconstructed holograms.

As shown in FIGS. 2a and 2b, a readout beam 20 penetrates into a waveguide layer through coupler 15i (or 16i). Then, the readout beam propagates along respective row ij as a guided wave 21ij and reconstructs radiation beams 22ijk from all its holograms simultaneously. Reconstructed radiation from each hologram propagates towards an output surface 02 and is restricted in its spatial angle γ.

When holograms have a specified spatial angle γ of radiation, the hologram pitch $p_=$ between adjacent holograms is established so as to provide an intersection of said radiation at plane 03 and in the area above this plane. All reconstructed radiation beams form focused data page images at parallel plane 04.

Figure 3:
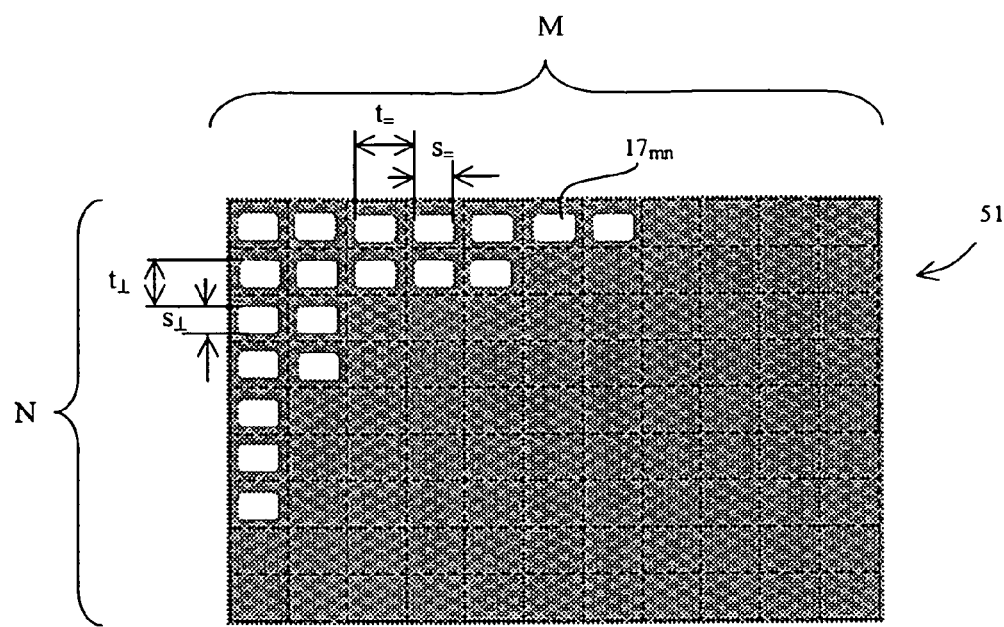
FIG. 3 shows a data page image pattern to be stored holographically in a focusing plane.

FIG. 3 shows a data page image pattern 51 in the focusing plane 04. Data pixels 17mn have sizes $s_=$, $s_\perp$ and pitches $t_=$, $t_\perp$ and are disposed as a 2-D matrix. m and n are current pixel indices along rows and columns respectively. All data page images have the same orientation. M and N are quantities of data pixels in the respective direction.

Figure 4:
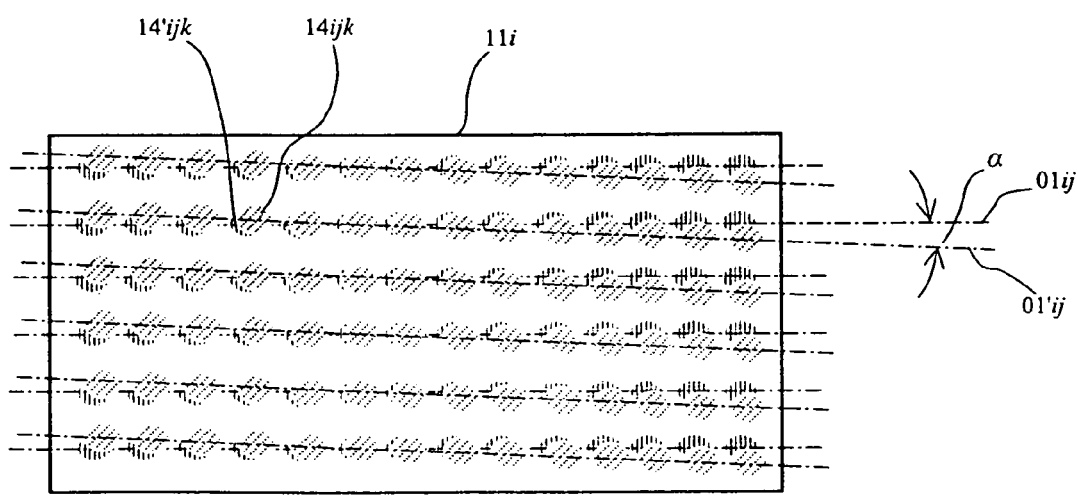
FIG. 4 shows a hologram layer with a superimposed hologram.

FIG. 4 shows a hologram layer with superimposed holograms. The angle between non-parallel row axes 01ij and 01'ij is α. Some holograms relating to different non-parallel intersecting rows are recorded so to be at least partially superimposed. The angle between any of two nearest non-parallel hologram rows is established to be not less than the angle selectivity of said superimposed holograms.

Readout Method and System

Figure 5:
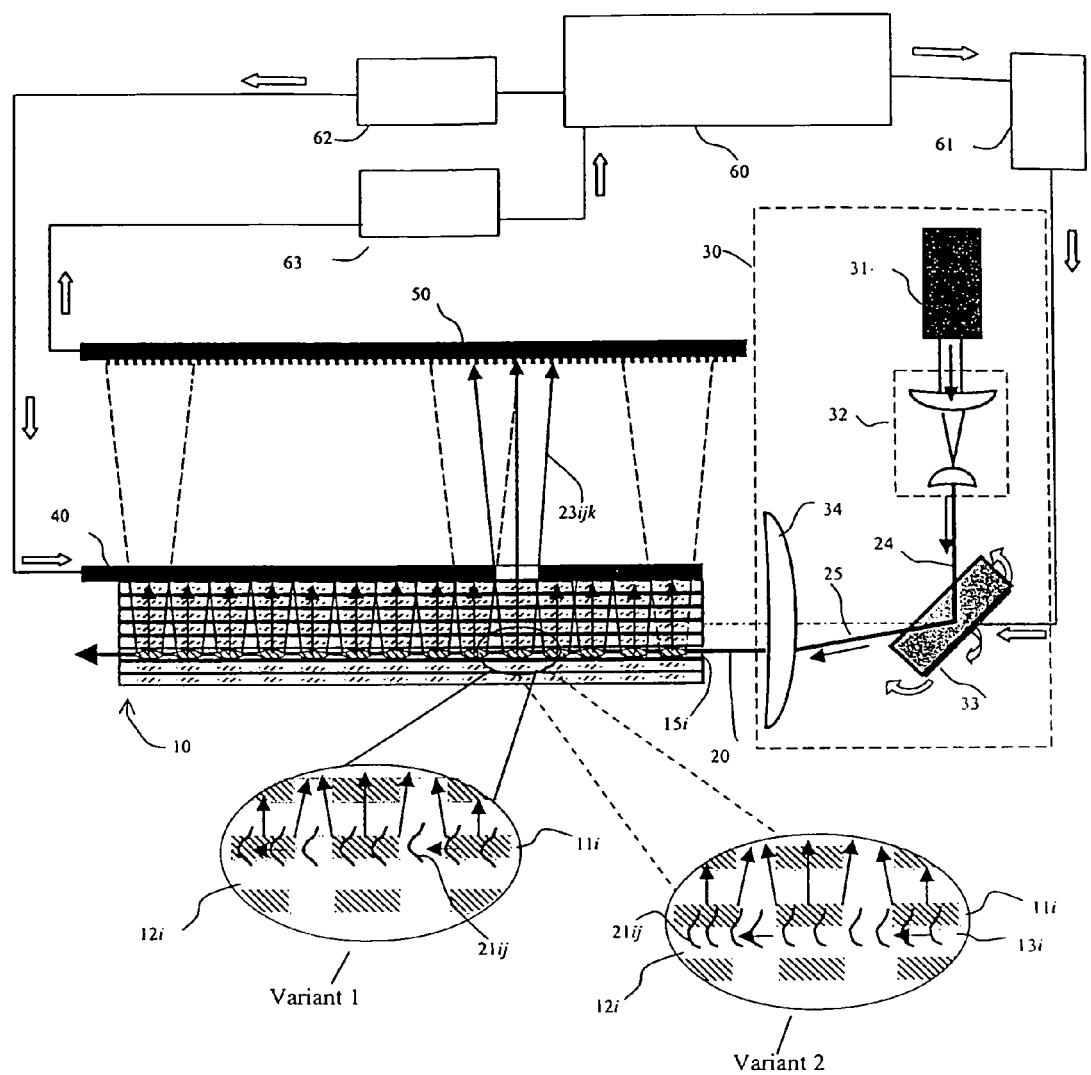
FIG. 5 illustrates a system with random data access for retrieving holographically stored data from a multilayer waveguide carrier.

FIG. 5 illustrates a system for retrieving holographically stored data from the multilayer waveguide carrier. The system includes a multilayer holographic waveguide data storage carrier 10 and a layer and row access unit 30. The layer and row access unit 30 is made up of a laser 31 for generating a beam of coherent radiation and a beam former 32 for forming a beam 24, which is deflected by angular deflector 33 and becomes beam 25 passing through an optical element (lens) 34 to a selected layer 11$i$ and, through the respective coupler 15$i$ (or 16$i$), into the selected layer along the required hologram row.

A hologram access unit 40 made in the form of a "moving window" is arranged in the region between planes 02 and 03 (see FIG. 2$a$) and intended for separating radiation 22$ijk$ from any hologram 14$ijk$ to gain access thereto and block radiation from other reconstructed holograms.

A multielement photodetector 50 faces towards the output surface 02 of the carrier, intended for receiving reconstructed radiation 22$ijk$ from said hologram, disposed at plane 04 of focus of this radiation and optically coupled with a pixel pattern 51 (see FIG. 3) of data stored by the hologram.

Lastly, a computer 60 is connected through respective interface units to control inputs of the layer and row access unit 61, hologram access unit 62 and the photodetector 63 to control their coordinated operation.

Figure 6:
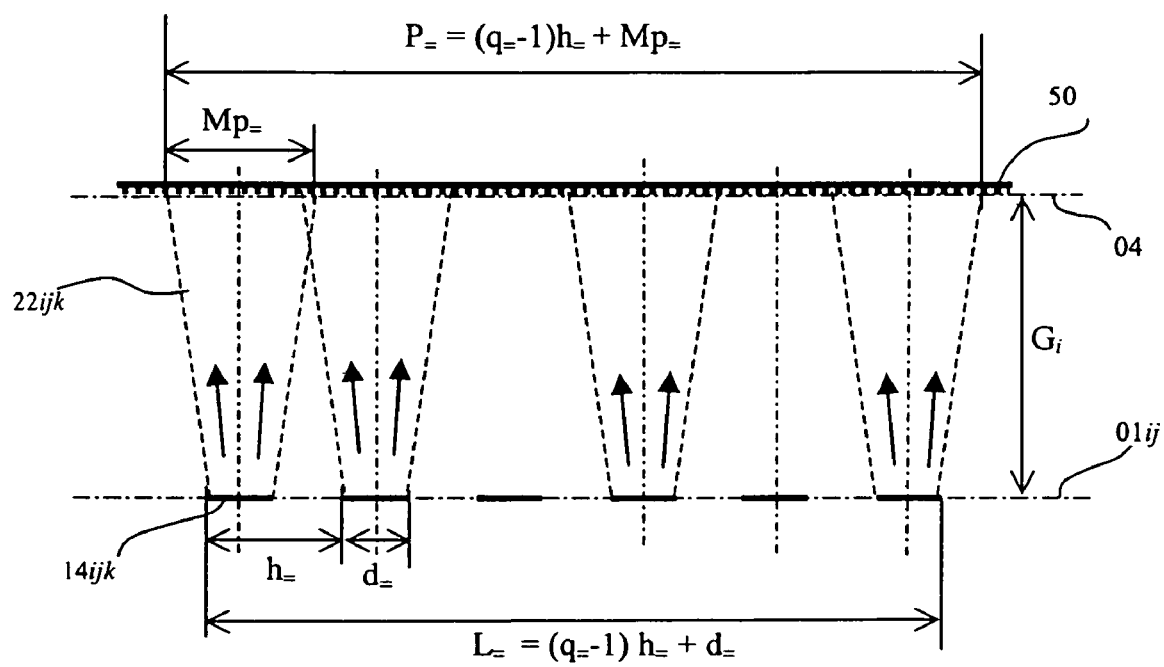
FIG. 6 illustrates a geometrical relationship between waveguide holograms in a hologram layer and a photodetector array.

FIG. 6 illustrates a geometrical relationship between waveguide hologram 14$ijk$ in a hologram layer and photodetector array 50.

The photodetector array pixel quantity $Q_=$ in one direction, which is parallel to the hologram rows and data rows, must be $Q_= = P_=/p_= \geq (q_=-1)h_=/p_= + M = [h_=(q_=-1)+Mp_=]/p_=$ where:

$P_=$ is the linear size of detector array along rows, $P_= = (q_=-1)h_= + Mp_=$;

$h_=$ is the hologram pitch along a row;

$q_=$ is the number of holograms in the row;

$p_=$ is the pitch of detector pixels along a row; and

M is the number of pixels of readout data in a data page row.

Respectively, the photodetector array pixel quantity in other direction, which is perpendicular to hologram and data page rows, must be $Q_\perp = Q_\perp/p_\perp \geq h_\perp(q_\perp-1)/p_\perp + N$, where:

$Q_\perp$ is the linear size of detector array along columns;

$h_\perp$ is the hologram pitch along a column;

$q_\perp$ is the number of holograms in the column;

$p_\perp$ is the pitch of detector pixels along the column; and

N is the number of pixels of readout data in a data page column.

$L_= = (q_=-1)h_= + d_=$ is the linear size of the hologram row in the selected direction. The pitch of data page image pixels is equal to or larger than the detector pixel pitch in which case it is a whole number multiple of it.

Figure 7:
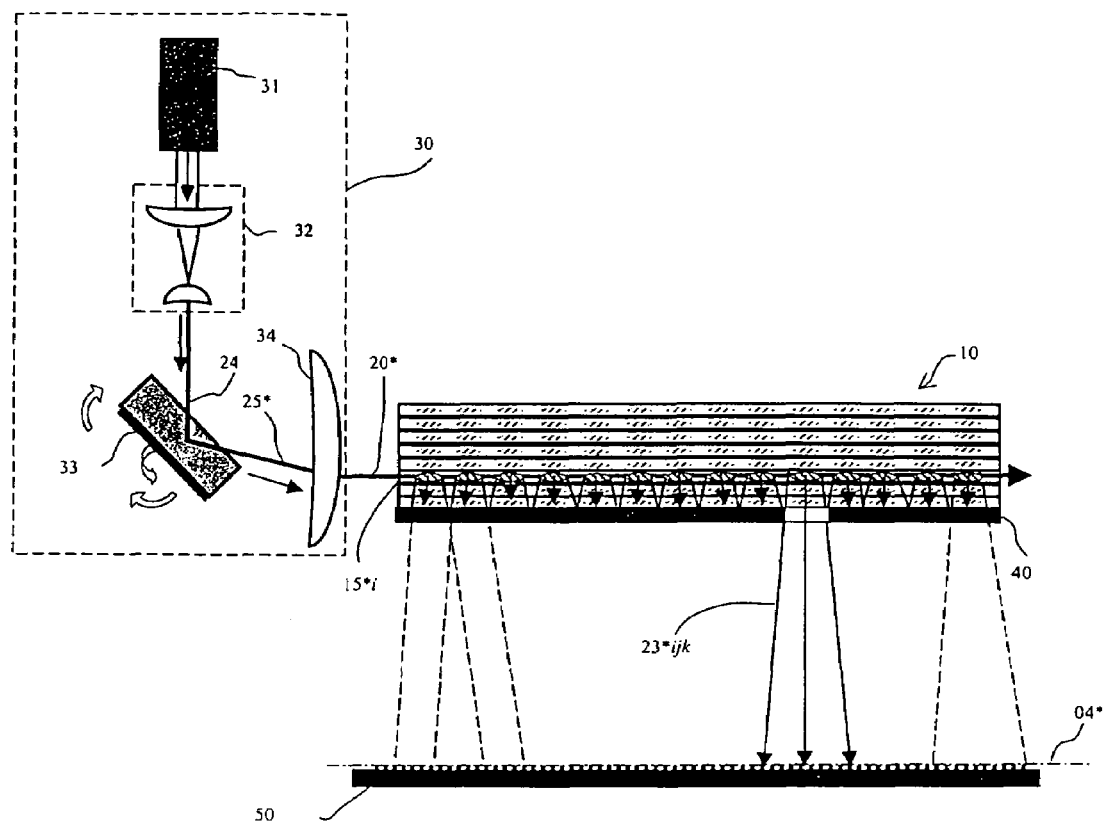
FIG. 7 illustrates a system for retrieving holographically stored data from a multilayer waveguide carrier utilizing a phase conjugate reference beam.

FIG. 7 illustrates a system for retrieving holographically stored data from a multilayer waveguide carrier utilizing a phase conjugate reference beam 20*. In comparison with FIG. 5, a conjugate coupler 15*$i$ is used and the photodetector is disposed at conjugate plane 04*.

Figure 8:
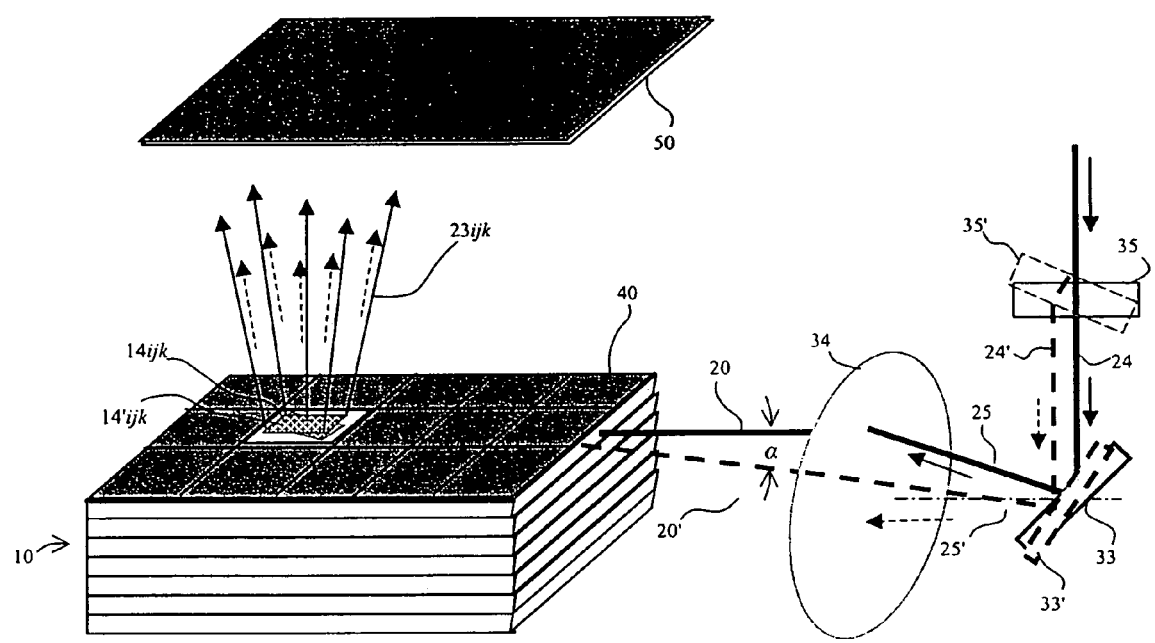
FIG. 8 illustrates a system for superimposed waveguide hologram reading.

FIG. 8 illustrates a system for superimposed waveguide hologram reading. Holograms from non-parallel rows are read by readout beams 20 and 20' having an angle • between them. An additional deflector is used in the layer and row access unit to provide the required additional angular deviation of reading beam 20 in a plane which is parallel to layer 11$i$. For example, it is possible to use a rotated optical plate 35 in addition to deflector 33 (made as a rotated mirror provided with a rotary actuator controlled by computer through the respective interface).

Figure 9:
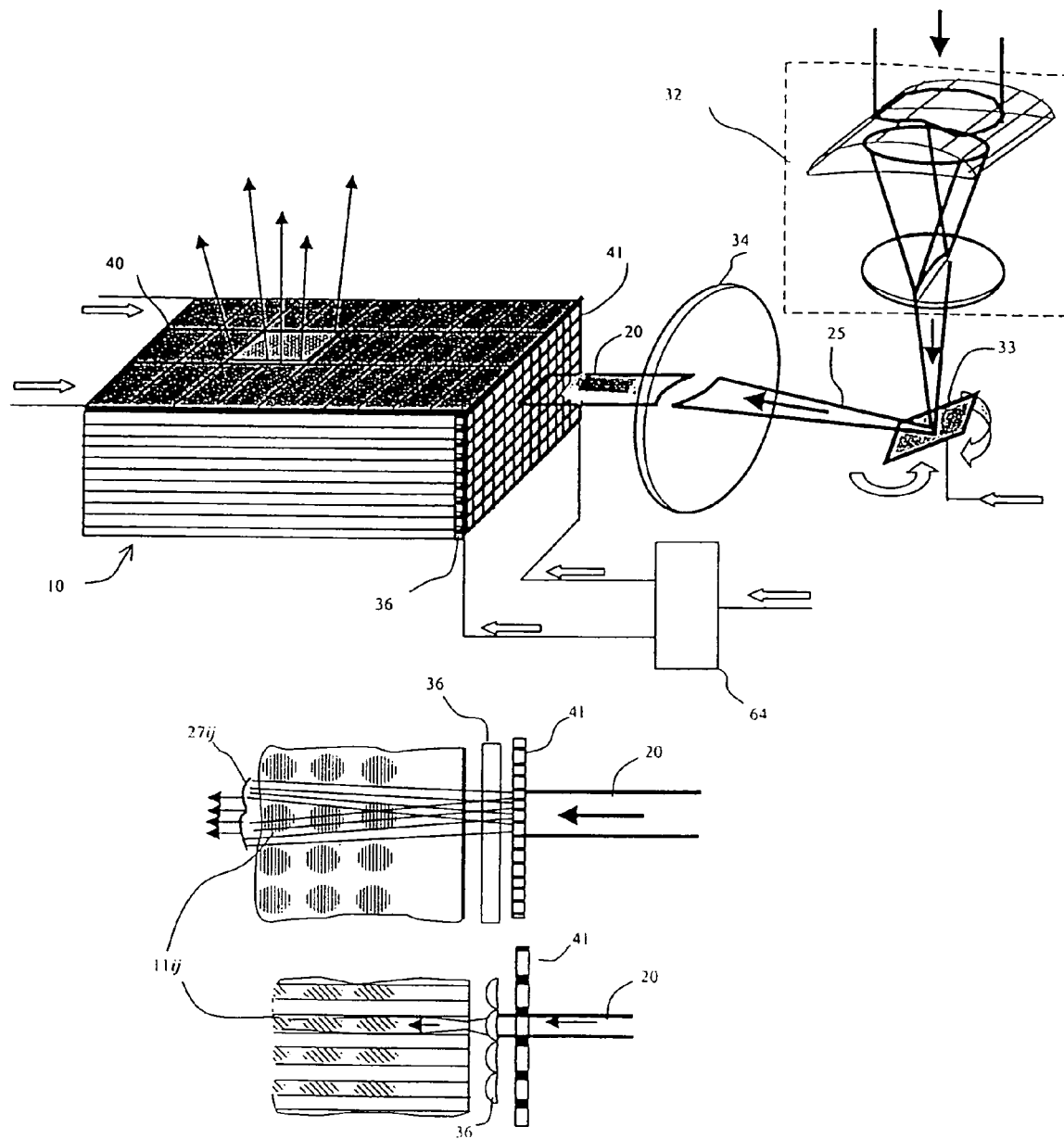
FIG. 9 illustrates a system for encrypted waveguide hologram reading.

FIG. 9 illustrates a system for encrypted waveguide hologram reading. A multichannel phase spatial light modulator 41 and cylindrical lens 36 are used respectively for readout beam encoding (encryption) and directing the encoded beam 27$ij$ into waveguide layer 11$i$.

Figure 10:
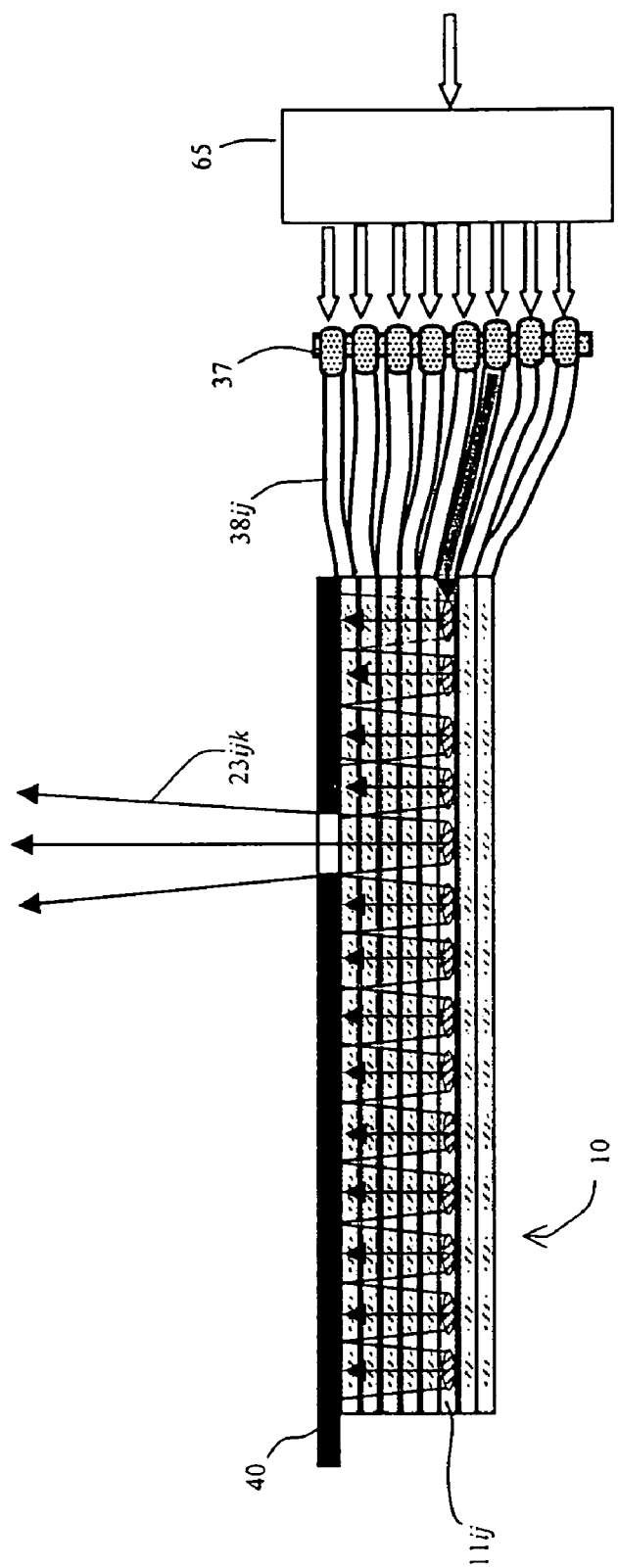
FIG. 10 illustrates a system for waveguide hologram reading by a laser matrix.

FIG. 10 illustrates a system for waveguide hologram reading by a laser matrix. Laser matrix 37 and optical fibers 38$ij$ are used for forming a separate readout beam for each hologram row. The computer controls each laser of matrix 37 through an interface 65.

Waveguide Hologram Recording Process and Apparatus

Holograms can be recorded as Fourier (or quasi Fourier) or Fresnel holograms of a two dimensional matrix of digital (binary or multilevel) or analog signals. Hologram matrices are recorded on separate layers. Then the hologram layers (and waveguide layers when used separately) and cladding layers are sandwiched together forming an optical contact between them, thus producing the multilayer waveguide holographic data storage carrier.

Fourier (or Quasi Fourier) Hologram Recording

Figure 11:
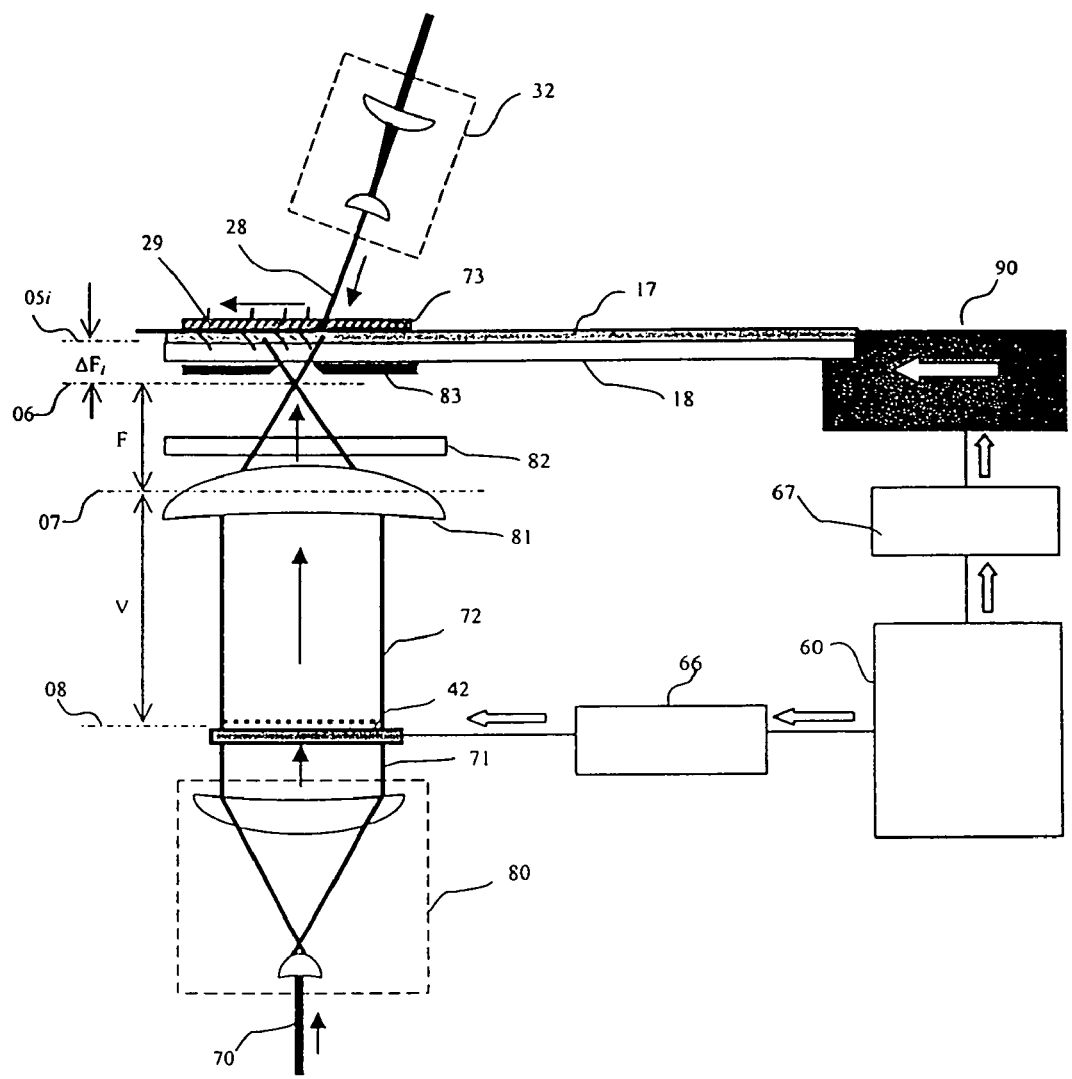
FIG. 11 represents a schematic view of a process and apparatus for recording a matrix of waveguide Fourier (quasi Fourier) holograms in a photorecording layer by using a diffraction grating coupler.

FIG. 11 represents a schematic view of a process and apparatus for recording a matrix of waveguide Fourier (or quasi Fourier) holograms in a photorecording layer by using a diffraction grating coupler. A monochromatic light source, such as a laser, generates a beam of coherent radiation that is split into a first (signal) beam 70 and a second beam which is used to form a reference beam 28 by optical means 32, as shown in FIG. 11. A signal collimated beam 71 expanded by standard optical means 80, such as lenses, passes through (or reflects from) a spatial light modulator (SLM) 42. The data page is displayed by SLM 42. Computer 60 forms control signals which arrive at SLM 42 through interface 66. Beam 72, modulated in amplitude (or phase, or polarization) according to the control signals, is focused at the plane 06 near the photorecording medium 17 by an optical element (lens) 81 following which it illuminates a local area of the photorecording medium 17. Thus, this local area is illuminated by an image of the Fourier (or quasi Fourier) transformation function of the data page. The layer of photorecording medium 17 is laminated on an optically transparent hard substrate 18 (for example, glass).

Simultaneously, reference beam 28 is transformed by diffraction grating reference beam coupler 73 into guided reference wave 29. Wave 29 then illuminates the same local area.

A diaphragm 83 may be located close to the photorecording medium surface for preventing parasitic illumination of the photorecording medium.

The optical system for forming the transformed data page image to be recorded in the medium 17 may be realized by different methods, which depend upon the character of the readout beam as described below:

1) Readout Beam is the Analog of a Reference Beam.

In this case, the distance between plane 07 (where the optical element 81 is located) and plane 08 (where the SLM 42 is located) is such that the reconstructed data page image will be located at the same distance from the photorecording medium as the distance from the hologram to the detector plane of the readout device. At the same time, the pitch of data page pixel images must be equal to, or a whole number multiple of the pitch of photodetector pixels. This means, for example, that if the pitch of readout data pixel images at the plane 04 of photodetector 50 (FIG. 6) is equal to the pitch of pixels displayed by the SLM, then a distance V between plane 08 and plane 07 is equal to the double focus length (2F) of lens 81. F is the distance between planes 06 and plane 07.

Different layers 11*i* (FIG. 5) of multilayer holographic carrier 10 are located at different distances Gi (FIG. 6) from the photodetector plane 04 (FIG. 5). Therefore, it is necessary to provide a condition: •Fi+Gi=constant. In this case, reconstructed data images from all layers of the carrier will have an identical scale.

Parallel plate 82 (FIG. 11) of optically transparent material (or a special phase compensator) is used to compensate for any difference in the optical distance from different layers to the detector plane. The thickness and refractive index of this plate must be such as to provide an optical analog of carrier layers located between given layer 11*i*, (FIG. 6) and photodetector plane 04 (FIG. 6).

2) Readout Beam (such as 20*, FIG. 7) is Phase Conjugate to the Reference Beam.

Figure 12:
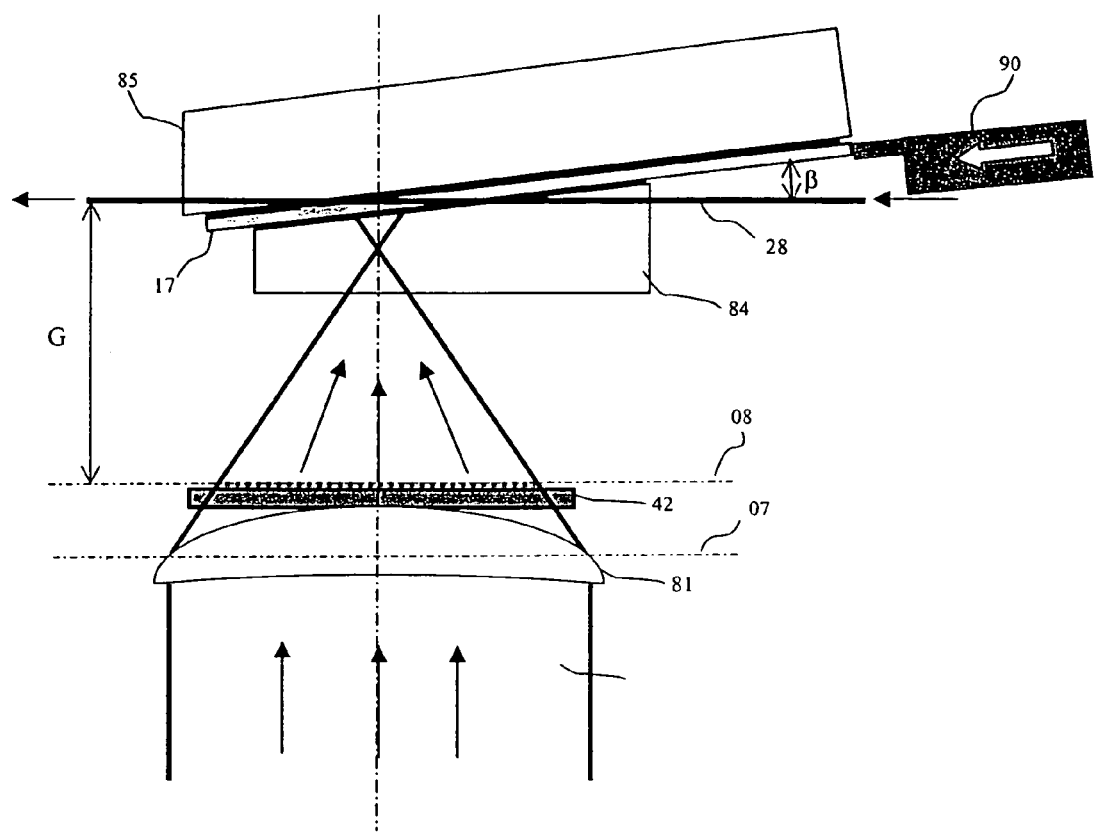
FIG. 12 represents a schematic view of a process and apparatus for recording a matrix of waveguide Fourier (quasi Fourier) holograms in a photorecording layer by using SLM disposed in a convergent beam.

In this case, as shown in FIG. 12, SLM 42 is in the convergent beam from lens 81 in the immediate proximity of plane 07.

Note: the readout of these type of holograms does not provide for using any image forming optics between hologram plane 01*i* (FIG. 6) and photodetector plane 04 (FIG. 6).

Figure 13:
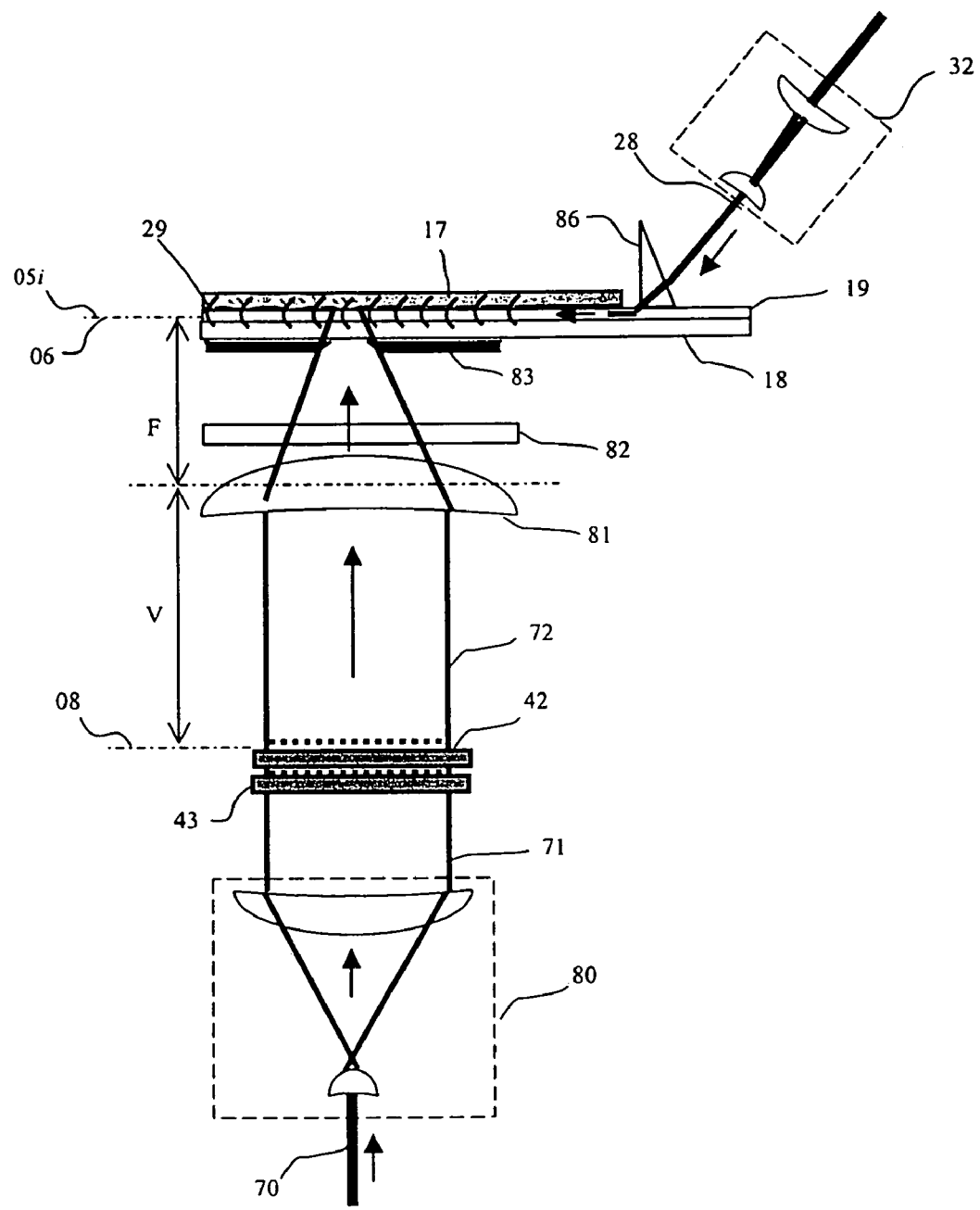
FIG. 13 represents a schematic view of a process and apparatus for recording a matrix of waveguide Fourier (quasi Fourier) holograms in a photorecording layer by using a random phase mask.

FIG. 13 represents a schematic view, which is the same as in FIG. 11, except for the use of a random phase mask 43 to provide a more uniform Fourier image distribution in hologram recording plane 05*i*. It is possible to use a phase spatial light modulator as a phase mask 43.

Hologram Recording Procedure

As shown in FIG. 11, guided reference wave 29 propagates in photorecording film layer 17 as in a waveguide. Simultaneously, the modulated signal beam (Fourier or quasi Fourier image) is directed along the line normal to the photorecording film layer. Holograms are recorded by sequentially shifting the photorecording layer after each recording along a distance in the specified direction which is equal to the pitch size $h_=$ of the holograms to be recorded. Two-coordinate positioner 90 is used to make the shifting and is controlled by computer 60 through interface 67. The pitch ($h_=$ and $h_\perp$, FIG. 1*a,b*) of holograms must be divisible by a whole number of photodetector pixels $p_=$ and $p_\perp$ (FIG. 6). Recorded holograms are arranged in hologram rows forming a matrix in the photorecording layer.

FIG. 13 illustrates variants of the recording procedure using a carrier, which contains two different layers: a photorecording (photosensitive) layer 17 and a waveguide layer 19. In particular, the reference beam is directed into waveguide layer 19 by a prism coupler 86.

Figure 14:
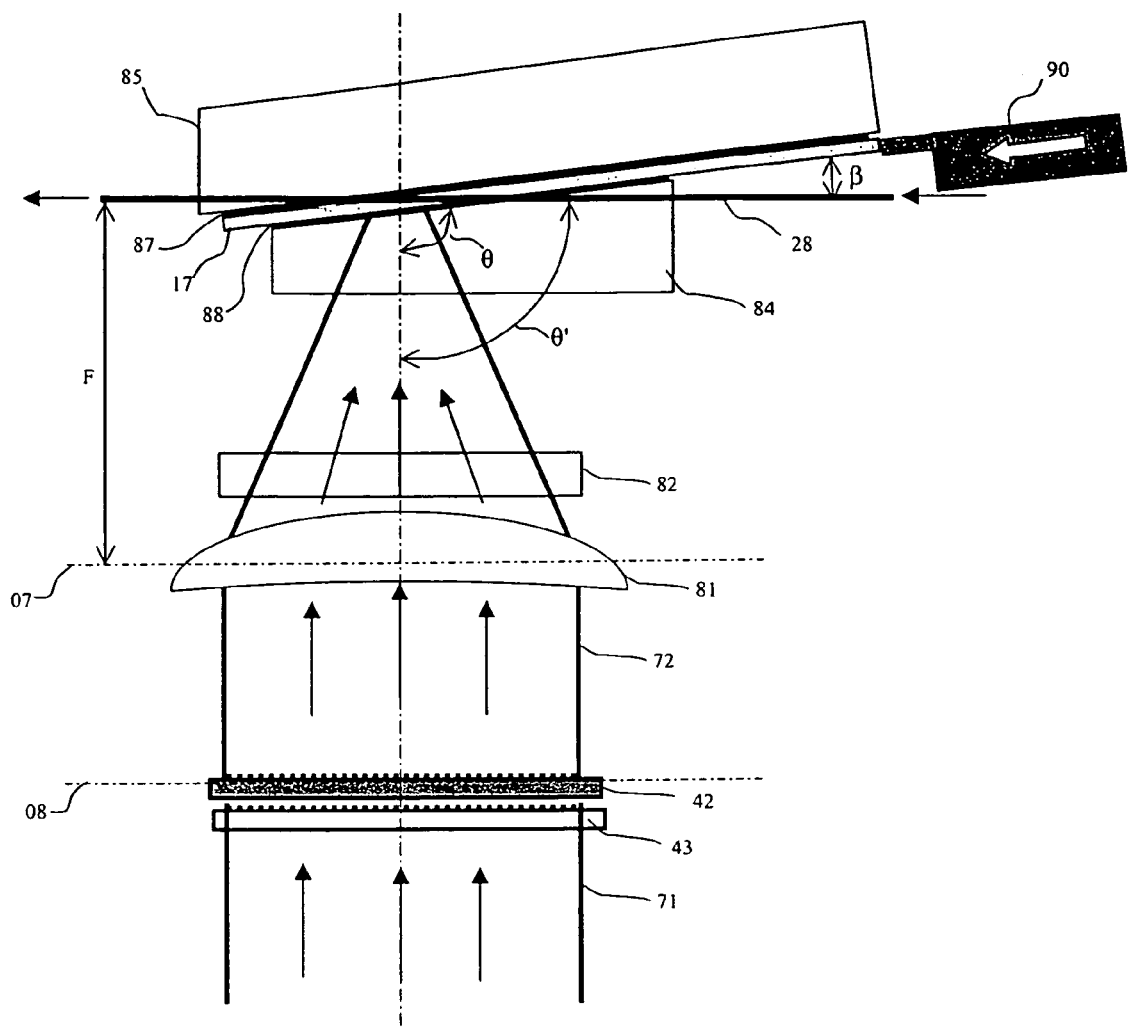
FIG. 14 represents a schematic view of a process and apparatus for recording a matrix of waveguide Fourier (quasi Fourier) holograms in a layer by using a small angle input of a reference beam.

As shown in FIG. 12 and FIG. 14, the reference beam 28 is directed at a small angle β to the photorecording layer 17. If the photorecording layer does not have a hard substrate, it is possible to place this layer between optical plates 84 and 85 by using immersion layers 87 and 88 having a refractive index close to that of the photorecording layer.

Fresnel Holograms Recording

Figure 15:
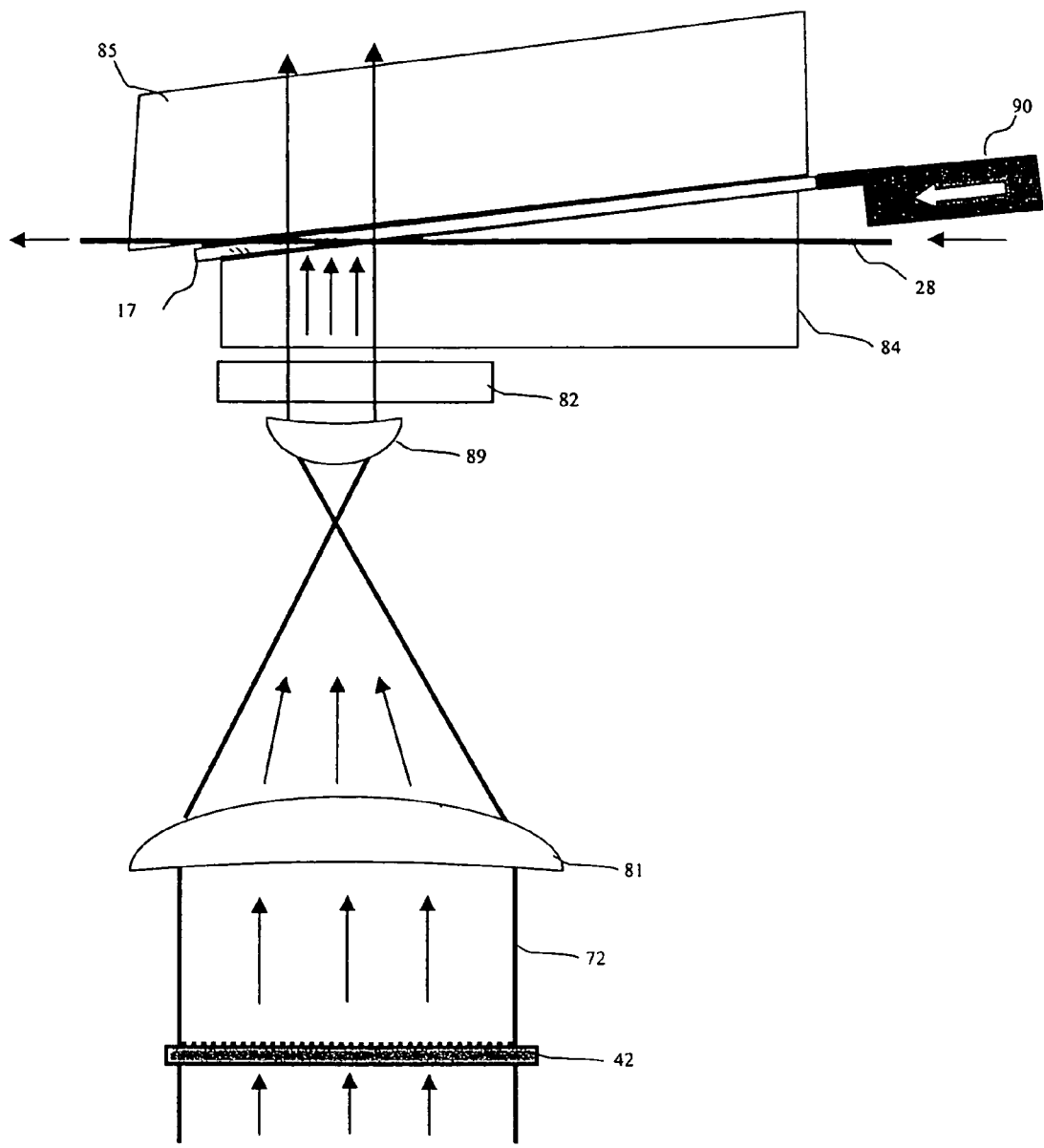
FIG. 15 represents a schematic view of the single layer matrix waveguide Fresnel hologram recording process and apparatus.

In this case, the readout is to be made by the conjugate reference beam. The recording procedure is the same as described above, but, as shown in FIG. 15, optical elements, such as focusing lens 81 and collimating lens 89, form a Fresnel image of SLM data page 42 in the hologram recording plane 05*i*.

Formation of a diffraction grating to couple the reference beam to the waveguide layer.

Grating coupler 16*i* (FIG. 1*b*) is recorded by a holographic method on the periphery of the photorecording layer 11*i* (FIGS. 1*a*, 1*b*), which is also a waveguide layer, or it is formed on the periphery of separate waveguide layer 13*i* (FIGS. 1*a*, 1*b*) by stamping, etching or other known methods.

Superimposed Hologram Recording

Figure 16:
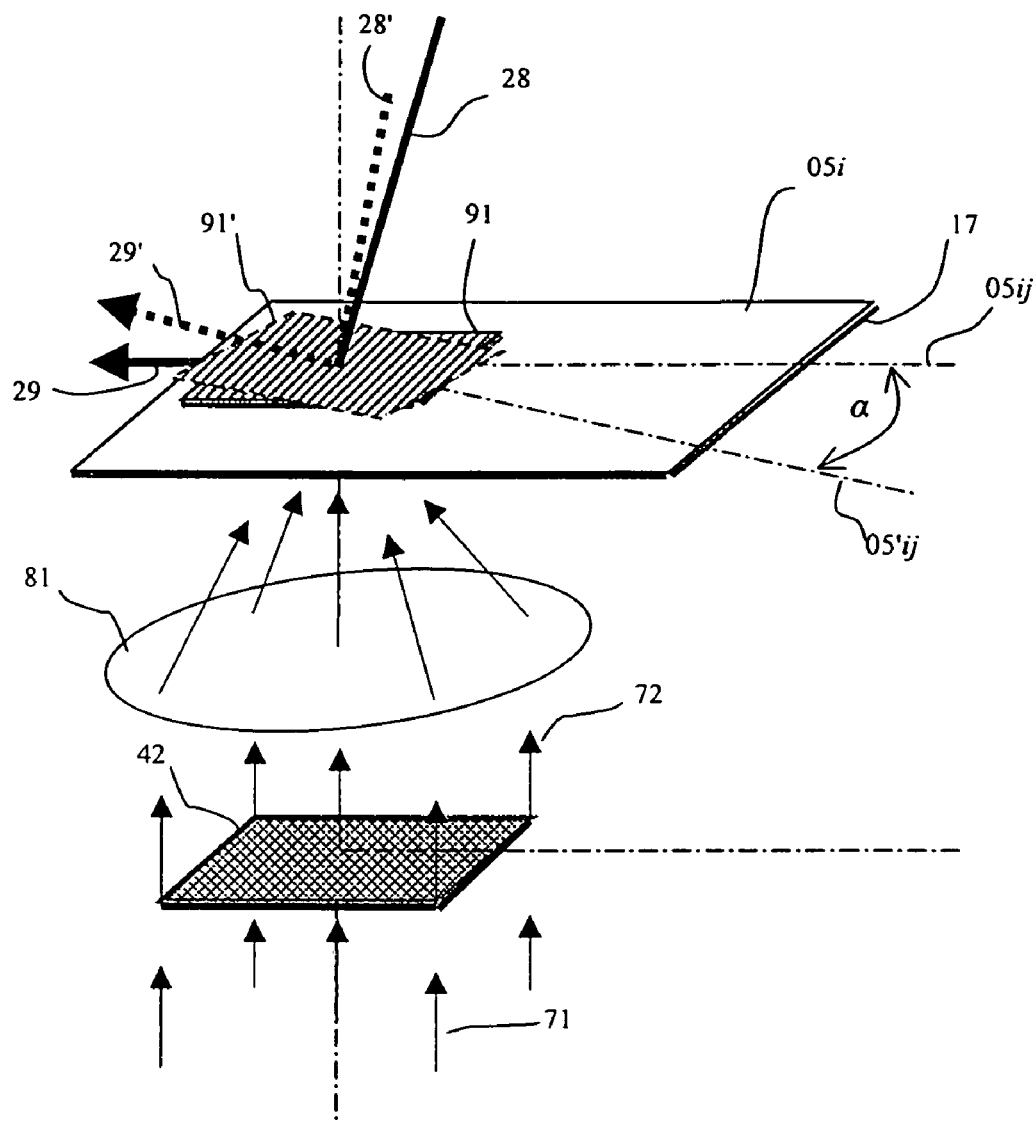
FIG. 16 illustrates a system for multiplexed waveguide hologram recording.

The recording procedure is the same as described above, but as shown in FIG. 16, at least two superimposed hologram 91 and 91' are recorded sequentially in the overlapping area with different propagation directions 29 and 29' of the reference beam in the hologram recording plane 05*i*. A minimum angle • between reference beam directions is necessary to provide the independent readout of holograms by the appropriate readout beam.

Encrypted Hologram Recording

The recording procedure is the same as described above, but the reference beam is formed by the same method as that used for forming a readout encoded beam 27*ij* (FIG. 9).

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A multilayer holographic data storage system, comprising:
   a) at least two groups of layers, each group containing:
      i) a hologram layer (11*i*) having holograms (14*ijk*) for storing data, said holograms arranged in one or more hologram rows, wherein within each of said rows said holograms are non-overlapping and wherein said holograms within any one of said rows can be reconstructed simultaneously by one guided wave;
      ii) a waveguide layer (13*i*) provided with a coupler (15*i*); and
      iii) a cladding layer (12*i*) located on the outer surface of said waveguide layer between adjoining layer groups,
   wherein each said hologram (14*ijk*) is capable of reconstructing radiation towards a planar output surface (02) and wherein said radiation from each said hologram is restricted in its spatial angle in order to provide for separation from radiation from adjacent ones of said holograms, and
   wherein said holograms (14*ijk*) in said hologram layers are recorded such that radiation therefrom is focused at a common focusing plane (04),
   b) a photodetector (50) for receiving radiation from said holograms (14*ijk*), said photodetector disposed at or near said common focusing plane (04);
   c) a hologram access unit (40) located in a region between said output surface (02) and plane of intersection of said radiation (03), said hologram access unit operative to separate radiation from a selected one of said holograms from radiation from other ones of said holograms;
   d) a layer and row access unit (30) for forming and directing a readout beam (20) to a selected layer and, through a respective coupler (15*i*), thereinto along one of said rows;
   wherein a row of data pixel images from each said hologram at a receiving surface of the photodetector is parallel to rows of pixels of said photodetector, and wherein a pitch of said data pixel images in a direction parallel to said rows of data pixel images is equal to, or a whole number multiple of, a pitch of pixels of said photodetector in said direction;

wherein said pitch of data pixel images is equal to said pitch of said pixels of said photodector and a center of each data pixel image is disposed at a center of a corresponding one of said photodetector pixels;

wherein said photodetector (50) is disposed in an area of the intersection of radiation from said holograms; and wherein a number of said photodetector pixels in said direction is sufficient to cover data pixel images from all said holograms without moving the photodetector in the focusing plane (04) and determined by an expression:

$Q \geq [h(q-1)/p+M]$, where h is the hologram pitch, q is the number of holograms in the hologram row, p is the photodetector pixel pitch, M is the number of data pixel images in said direction.

2. The data storage system according to claim 1, further comprising:

a computer (60) having interface units connected to control inputs of said layer and row access unit (30) arid said hologram access unit (40) and to control inputs arid outputs of said photodetector (50) for controlling coordinated operation and for processing readout data.

3. The data storage system according to claim 1, wherein said holograms are arranged with an equal hologram pitch between ones of said holograms in the same row, and wherein each of said holograms has a similar spatial angle.

4. The data storage system according to claim 1, wherein a row pitch between adjacent ones of said rows is equal to or greater than a hologram size in a direction perpendicular to said adjacent rows.

5. The data storage system according to claim 1, wherein at least two of said rows are not parallel to one another and wherein at least two of said holograms, each located in a different one of two of said non-parallel rows, are recorded so as to be at least partially superimposed on one another.

6. The data storage system according to claim 5, wherein an angle between said two non-parallel rows is greater than or equal to an angle selectivity of said two superimposed holograms.

7. The data storage system according to claim 1, wherein said holograms are recorded such that radiation from each one of said holograms is focused at one of two common focusing places (04).

8. The data storage system according to claim 1, wherein each said hologram in each said hologram layer stores a two-dimensional pixel pattern of a data page.

9. The data storage system according to claim 1, wherein said hologram layer and said waveguide layer of each of said groups of layers comprise the same layer.

10. The data storage system according to claim 1, wherein said hologram layer (11*i*) and said waveguide layer (13*i*) in each of said groups of layers are connected by an optical contact to provide transmission of said guided wave into said hologram layer.

11. The data storage system according to claim 1, wherein said hologram access unit is disposed at said output surface (02).

12. The data storage system according to claim 1, wherein a width of said window is adjustable in response to a distance of the respective hologram layer from the output surface and said spatial angle of the respective hologram.

13. A method of reading data stored in a multilayer holographic data storage system (10), comprising:

a) providing a holographic data storage system having at least two groups of layers, each group containing:

i) a hologram layer (13*i*) having holograms (14*ijk*) for storing data, said holograms being arranged in one or more hologram rows, wherein within each of said rows said holograms are nonoverlapping and wherein said holograms within any one of said rows can be reconstructed simultaneously by one guided wave;

ii) a waveguide layer (13*i*) provided with a coupler; and iii) a cladding layer (12*i*) located on the outer surface of said waveguide layer between adjacent layer groups;

wherein each said hologram (14*ijk*) is capable of reconstructing radiation towards a planar output surface (02) and wherein said radiation from each said hologram is restricted in its spatial angle in order to provide for separation from radiation from adjacent ones of said holograms, and wherein said holograms (14*ijk*) in said hologram layers are recorded such that radiation therefrom is focused at a common focusing plane (04), iv) a photodetector (50) for receiving radiation from said holograms (14*ijk*), said photodetector disposed at or near said common focusing plans (04);

v) a hologram access unit (40) located in a region between said output surface (02) and plane of intersection of said radiation (03), said hologram access unit operative to separate radiation from a selected one of said holograms from radiation from other ones of said holograms;

vi) a layer and row access unit (30) for forming and directing a readout beam (20) to a selected layer and, through a respective coupler (15*i*), thereinto along one of said rows;

wherein said step of receiving reconstructed radiation is carried out by means of a multielement photodetector (50) disposed in said area at the focusing plane of said radiation and oriented so that a row of data pixel images from each said reconstructed hologram at a receiving surface of the photodetector is aligned along a pixel row of the latter, while the number of photodetector pixels in this direction is established so as to cover data pixel images from all said holograms without moving the photodetector in the focusing plane and determined by an expression:

$Q \geq h(g-1)p+M$, where h—is the hologram pitch, q—is a quantity of holograms in the hologram row, p—is the photodetector pixel pitch, M—is a quantity of data pixel images in said direction;

b) directing a readout beam into a selected one of said waveguide layers (13*i*) and into one of said hologram layers along at least one of said hologram rows and reconstructing ones of said holograms located in said row; and c) receiving reconstructed radiation from a selected hologram at said common focusing plane for processing read out data.

14. The method of claim 13, wherein said multilayer holographic data storage system further includes a computer

(60) having interface units connected to control inputs of said layer and row access unit (30) and said hologram access unit (40) and to control inputs and outputs of said photodetector (50) for controlling coordinated operation and for processing readout data.

15. The method of claim 13, further comprising a step of selecting radiation from one of said holograms for reception at said common focusing place, said selecting step being carried out by a hologram access unit (40) having an electronically moveable window for transmitting this radiation therethrough and blocking radiation iron other reconstructed holograms.

16. The method of claim 13, wherein said reconstructed radiation is received by a photodetector (50) facing towards said output surface (02), disposed at said common focusing plane (04).

* * * * *